(12) United States Patent
Lin et al.

(10) Patent No.: US 8,783,641 B2
(45) Date of Patent: Jul. 22, 2014

(54) FOLDABLE SUPPORTING BRACKET FOR PORTABLE ELECTRONIC APPARATUS

(71) Applicant: Cooler Master Co., Ltd., New Taipei (TW)

(72) Inventors: Ben-Tien Lin, New Taipei (TW);
Ching-Feng Shih, New Taipei (TW);
Chun-Che Chang, New Taipei (TW);
Wen-Ping Tu, New Taipei (TW)

(73) Assignee: Cooler Master Development Corporation, New Taipei (TW)

( * ) Notice: Subject to any disclaimer, the term of this patent is extended or adjusted under 35 U.S.C. 154(b) by 0 days.

(21) Appl. No.: 13/738,229

(22) Filed: Jan. 10, 2013

(65) Prior Publication Data

US 2013/0181106 A1    Jul. 18, 2013

(30) Foreign Application Priority Data

Jan. 12, 2012 (TW) ............................ 101200789 A

(51) Int. Cl.
*A47B 97/04* (2006.01)
*F16M 11/38* (2006.01)

(52) U.S. Cl.
USPC ......... 248/463; 248/462; 248/166; 248/188.6

(58) Field of Classification Search
USPC ............... 248/166, 346.06, 310, 281.11, 448,
248/460, 918, 346.03, 346.3, 447, 457, 463,
248/464; D14/447, 253; 16/367, 368
See application file for complete search history.

(56) References Cited

U.S. PATENT DOCUMENTS

| | | | | |
|---|---|---|---|---|
| 6,412,742 B1* | 7/2002 | Yu | ................................ | 248/434 |
| 7,503,539 B2* | 3/2009 | Knight | ......................... | 248/448 |
| 7,712,719 B2* | 5/2010 | Derry et al. | ............. | 248/346.06 |
| D656,500 S * | 3/2012 | Maruyama et al. | .......... | D14/447 |
| D668,256 S * | 10/2012 | Matteo | ......................... | D14/447 |
| D670,296 S * | 11/2012 | Seehoff | ........................ | D14/447 |
| 8,336,168 B2* | 12/2012 | Huang et al. | .................... | 16/369 |
| D679,700 S * | 4/2013 | Werth | ......................... | D14/253 |
| 8,540,202 B2* | 9/2013 | Hu et al. | ....................... | 248/371 |
| 2012/0001045 A1* | 1/2012 | Wang | ....................... | 248/281.11 |

* cited by examiner

*Primary Examiner* — Tan Le
(74) *Attorney, Agent, or Firm* — Chun-Ming Shih; HDLS IPR Services

(57) ABSTRACT

A foldable supporting bracket for a portable electronic apparatus includes a supporting arm, a holding element, and two load-bearing bars. The supporting arm has a first pivot shaft at one terminal thereof and the holding element has a second pivot shaft at one terminal thereof. The two load-bearing bars are separated to each other and pivotally arranged between the first pivot shaft and the second pivot shaft to form a hollow containing region. The supporting arm and the holding element are pivotally connected to the two load-bearing bars via the first pivot shaft and the second pivot shat, respectively, so that the supporting arm and the holding element are flipped toward the hollow containing region. Accordingly, the supporting arm and the holding element are folded in the hollow containing region and then levelly arranged to the two load-bearing bars, thus reducing occupied space and increasing carry convenience.

12 Claims, 6 Drawing Sheets

FOLDABLE SUPPORTING BRACKET FOR PORTABLE ELECTRONIC APPARATUS

This application is based on and claims the benefit of Taiwan Application No. 101200789 filed Jan. 12, 2012 the entire disclosure of which is incorporated by reference herein.

BACKGROUND

1. Technical Field

The present disclosure relates generally to a peripheral accessory for a portable electronic apparatus, and more particularly to a foldable supporting bracket for the portable electronic apparatus of conveniently operating or placing the portable electronic apparatus when the foldable supporting bracket is unfolded and easily carrying the foldable supporting bracket when the foldable supporting bracket is folded.

2. Description of Related Art

Since 3C industries have been developed rapidly in recent years, many different types of portable electronic apparatuses have been introduced, such as PDAs, MP3s, cell phones, handheld game consoles, tablet computers, notebook computers, and so on. In particular, these portable electronic apparatuses ban be used anytime and anywhere when people engage in outdoor or indoor activities. Accordingly, supporting bracket-related products for supporting portable electronic apparatuses have been published and became commercially available.

Traditional supporting brackets for supporting the portable electronic apparatuses are provided to make the portable electronic apparatus be placed at different declining angels based on the triangle principle. After folding the supporting bracket, however, the overall thickness of the supporting bracket is increased so that it is not conducive to store and carry the supporting bracket and contrary to the features of light, thin, short, and small of the portable electronic apparatuses.

Accordingly, it is desirable to provide a foldable supporting bracket for a portable electronic apparatus to solve the above-mentioned problems.

SUMMARY

An object of the present disclosure is to provide a foldable supporting bracket for a portable electronic apparatus that the foldable supporting bracket can be folded to reduce occupied space and increase carry convenience.

Accordingly, the foldable supporting bracket for the portable electronic apparatus includes a supporting arm, a holding element, and two load-bearing bars. The supporting arm has a first pivot shaft at one terminal thereof and the holding element has a second pivot shaft at one terminal thereof. The two load-bearing bars are separated to each and pivotally arranged between the first pivot shaft and the second pivot shaft to form a hollow containing region. The supporting arm and the holding element are pivotally connected to the two load-bearing bars via the first pivot shaft and the second pivot shat, respectively, so that the foldable supporting bracket is folded when the supporting arm and the holding element are flipped toward the hollow containing region, thus reducing occupied space and increasing carry convenience.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The features of the present disclosure believed to be novel are set forth with particularity in the appended claims. The present disclosure itself, however, may be best understood by reference to the following detailed description of the present disclosure, which describes an exemplary embodiment of the present disclosure, taken in conjunction with the accompanying drawings, in which:

DETAILED DESCRIPTION

Figure 1:
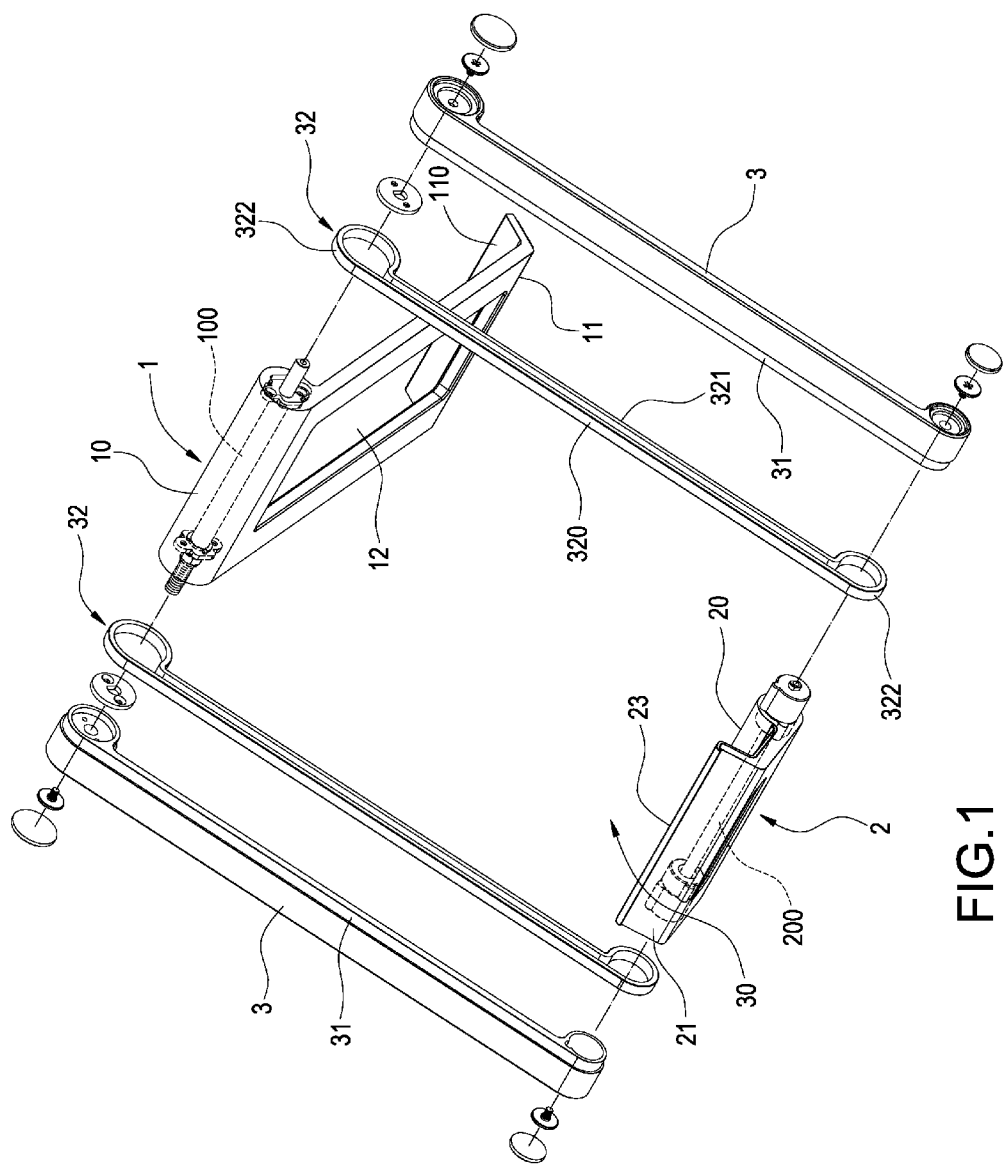
FIG. 1 is a schematic exploded perspective view of a foldable supporting bracket according to the present disclosure.

Reference will now be made to the drawing figures to describe the present disclosure in detail.

Figure 2:
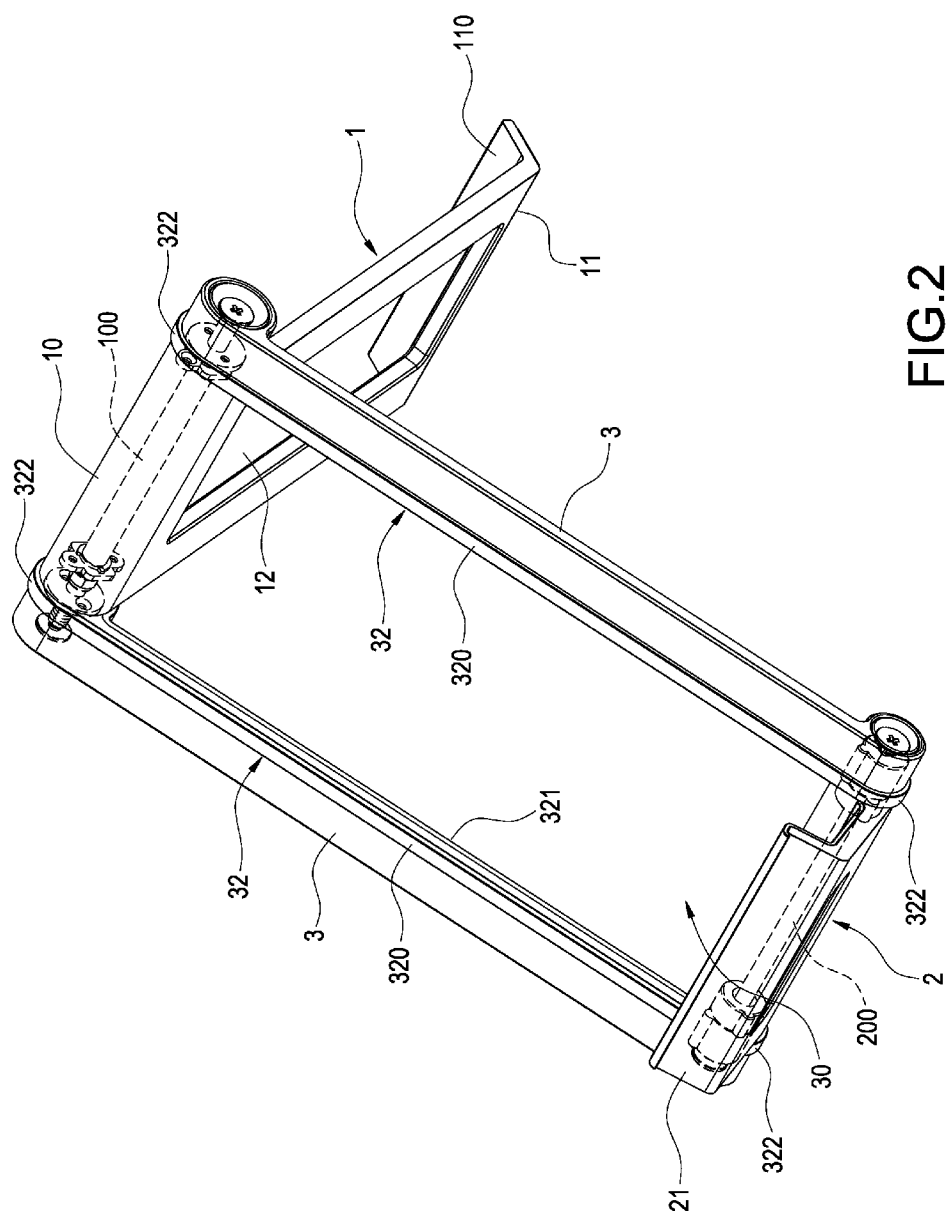
FIG. 2 is a perspective view of unfolding the foldable supporting bracket according to the present disclosure.
Figure 3:
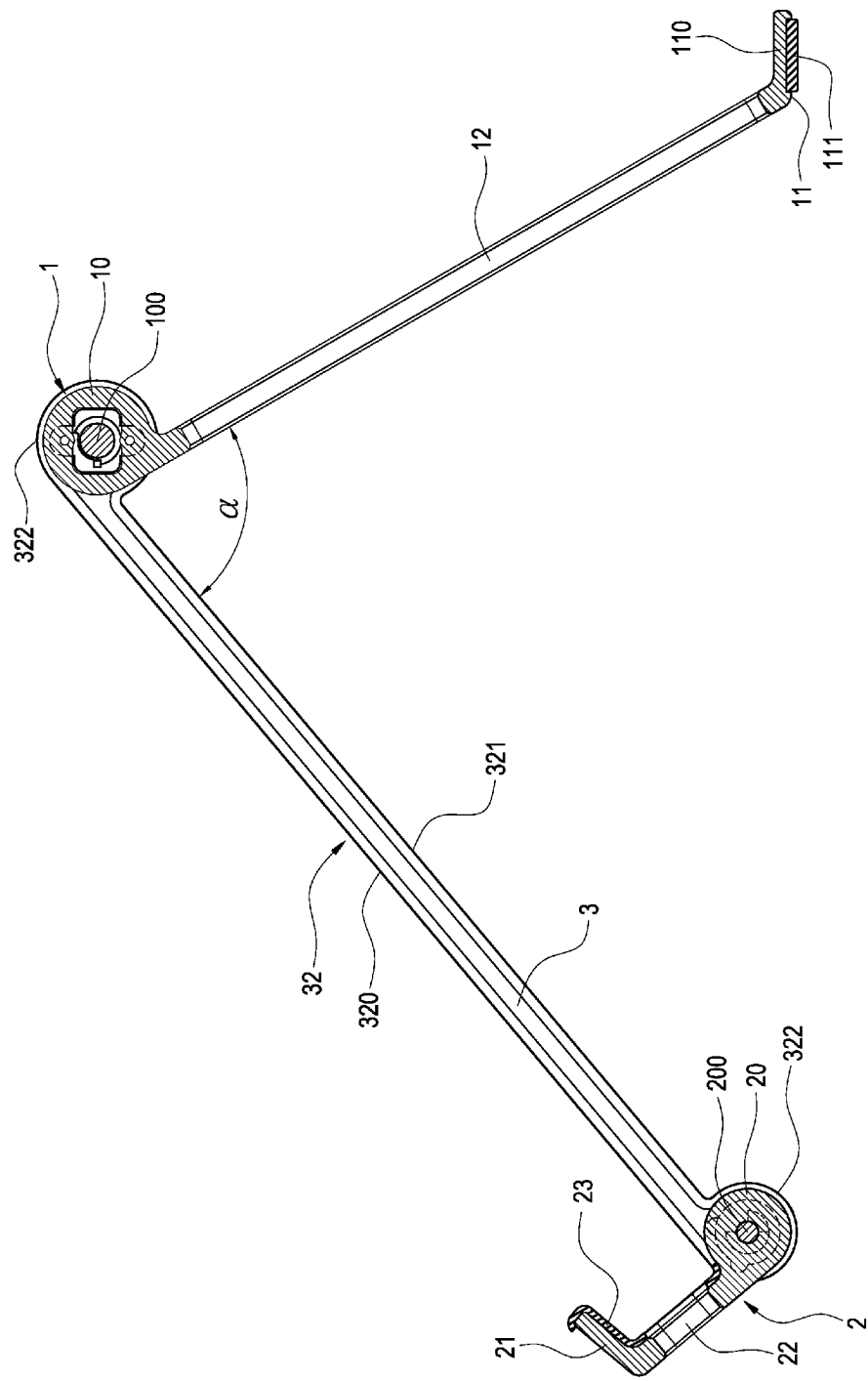
FIG. 3 is a side cross-sectional view of unfolding the foldable supporting bracket according to the present disclosure.

Reference is made to FIG. 1 to FIG. 3 which are a schematic exploded perspective view of a foldable supporting bracket and a perspective view and a side cross-sectional view of unfolding the foldable supporting bracket according to the present disclosure, respectively. The foldable supporting bracket is provided to support a portable electronic apparatus 4 (as shown hereinafter in FIG. 4) for conveniently operating or placing the portable electronic apparatus 4 when the foldable supporting bracket is unfolded or easily carrying the foldable supporting bracket when the foldable supporting bracket is folded (as shown hereinafter in FIG. 6). The foldable supporting bracket includes a supporting arm 1, a holding element 2, and two load-bearing bars 3. Especially, the supporting arm 1 can be long-strip-plate-shaped for supporting the portable electronic apparatus 4 to the desired elevation angle and maintaining the desired angle. The supporting arm 1 has not only a first pivot portion 10 at one terminal thereof and but also an abutting edge 11 at the other terminal thereof. The first pivot portion 10 is provided to contain a first pivot shaft 100 therein. The abutting edge 11 is outwardly extended and bent to form an abutting plate 110 to increase contact area between the supporting arm 1 and the portable electronic apparatus 4 and disperse support force so that the portable electronic apparatus 4 can be firmly placed. Also, the abutting plate 110 has an anti-slip mat 111 on a bottom surface thereof to prevent slipping. In addition, the supporting arm 1 has a hollow portion 12 and the hollow portion 12 can be provided to reduce the weight which the portable electronic apparatus 4 is placed on the supporting arm 1 and reduce material costs.

The holding element 2 can be an L-shaped plate, but not limited. The L-shaped holding element 2 is provided to hold a lower edge of the portable electronic apparatus 4 so that the portable electronic apparatus 4 can be supported by the supporting arm 1. The holding element 2 has not only a second pivot portion 20 at one terminal thereof and but also a baffle plate 21 at the other terminal thereof. The second pivot portion 20 is provided to contain a second pivot shaft 200 therein. The baffle plate 21 is provided to position the lower edge of the portable electronic apparatus 4 on the holding element 2 when the portable electronic apparatus 4 is placed on the holding element 2. Also, the holding element 2 has a hollow portion 22. In addition, the holding element 2 has an anti-slip mat 23 on a top surface thereof and the baffle plate 21 has an anti-slip mat 23 on an inner surface thereof to increase friction force between the portable electronic apparatus 4 and the holding element 2 and prevent slipping.

The two load-bearing bars 3 are separated to each and pivotally arranged between the supporting arm 1 and the first pivot shaft 100 and the second pivot shaft 200 of the holding element 2 to form a hollow containing region 30. The two load-bearing bars 3 are provided for the user to place the portable electronic apparatus 4 thereon. Each of the load-bearing bars 30 forms an embedding edge 31 on an inner side thereof and the embedding edge 31 is sleeved by a belt-shaped anti-slip loop 32. In this embodiment of the present disclosure, each of the anti-slip loops 32 has an upper strap portion 320, a lower strap portion 321, and two loop portions 322. One of the loop portions 322 is connected to one terminal of the upper strap portion 320 and one terminal of the lower strap portion 321, respectively, and the other of the loop portions 322 is connected to the other terminal of the upper strap portion 320 and the other terminal of the lower strap portion 321, respectively. In addition, the upper strap portion 320 protrudes from a surface of the load-bearing bar 3 to contact with the portable electronic apparatus 4 so that the portable electronic apparatus 4 can be firmly placed on the upper strap portion 320 due to increasing friction force between the portable electronic apparatus 4 and the two load-bearing bars 3. Accordingly, the foldable supporting bracket for the portable electronic apparatus 4 can be implemented according to the above-mentioned components.

Figure 4:
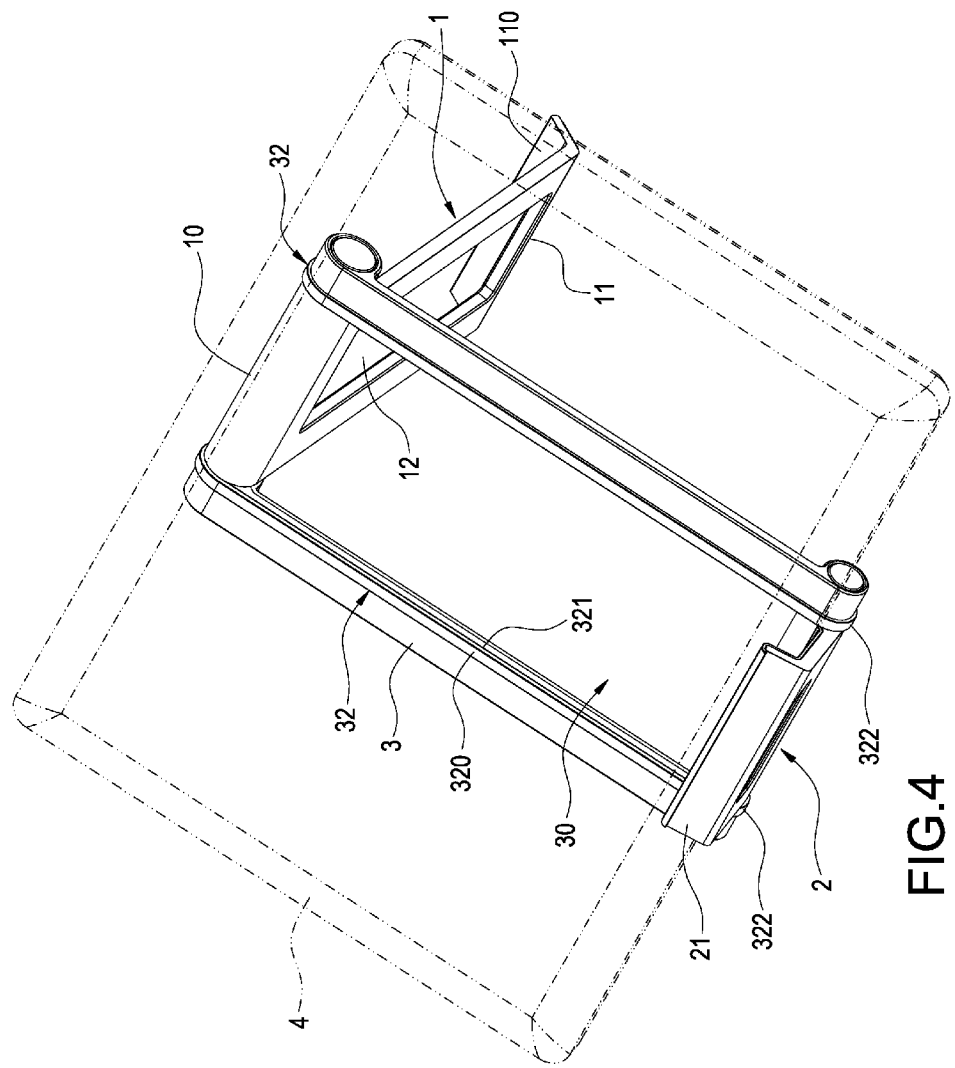
FIG. 4 is a schematic view of placing a portable electronic apparatus on the foldable supporting bracket according to the present disclosure.

As shown in FIG. 3, each of the load-bearing bars 3 and the supporting arm 1 form an included angle α when the foldable supporting bracket is unfolded. Especially, the included angle preferably ranges from 75 degrees to 85 degrees (in particular, the 80-degree included angle is exemplified) so that the desired elevation angle of the portable electronic apparatus 4 can be appropriately adjusted (as shown in FIG. 4) to meet the demand of the user.

Figure 5:
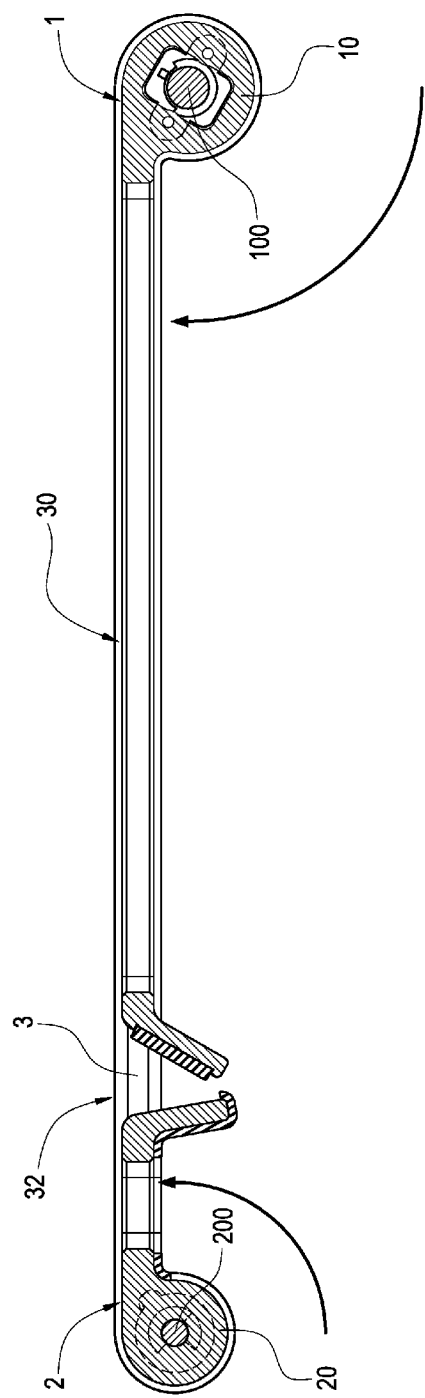
FIG. 5 is a side cross-sectional view of folding the foldable supporting bracket according to the present disclosure.
Figure 6:
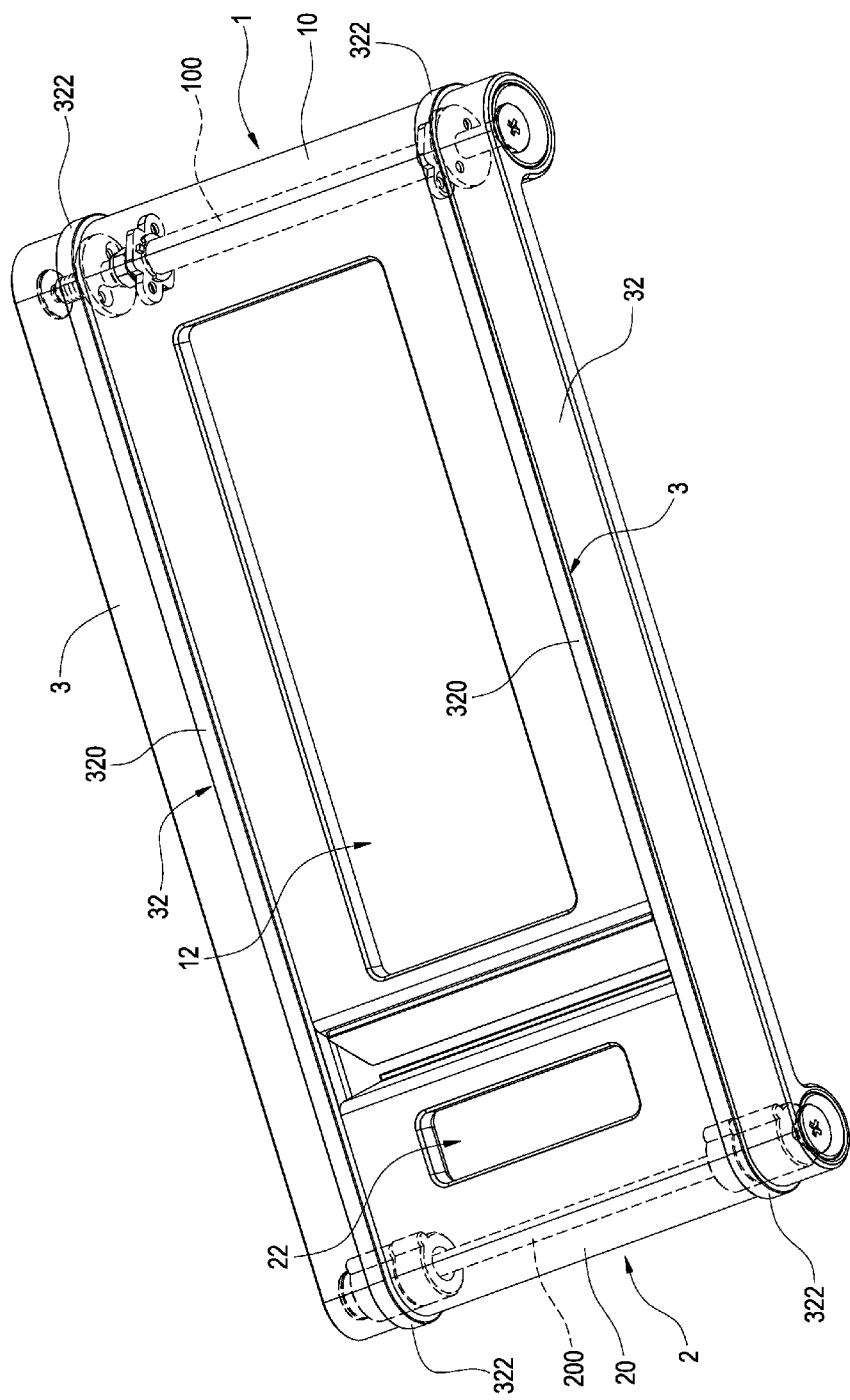
FIG. 6 is a perspective view of folding the foldable supporting bracket according to the present disclosure.

Furthermore, as shown in FIG. 5, the foldable supporting bracket can be folded as long as the supporting arm 1 and the holding element 2 are flipped toward the hollow containing region 30 so that the supporting arm 1 and the holding element 2 are contained in the hollow containing region 30 and then levelly arranged to the two load-bearing bars 3 (as shown in FIG. 6), thus reducing occupied space and increasing carry convenience.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A foldable supporting bracket for a portable electronic apparatus, comprising:
    a supporting arm having a first pivot shaft at one terminal thereof;
    a holding element having a second pivot shaft at one terminal thereof; and
    two load-bearing bars separated to each other and pivotally arranged between the first pivot shaft and the second pivot shaft so that two first distal ends of the first pivot shaft are connected between the two load-bearing bars, respectively, and two second distal ends of the second pivot shaft are also connected between the two load-bearing bars, respectively, to form a hollow containing region between the first pivot shaft, the second pivot shaft and the two load-bearing bars;
    wherein the supporting arm and the holding element are pivotally connected to the two load-bearing bars via the first pivot shaft and the second pivot shaft, respectively, so that the foldable supporting bracket is folded when the supporting arm and the holding element are flipped toward and located in the hollow containing region, and
    wherein the supporting arm has an abutting edge at the other terminal thereof and the abutting edge is outwardly extended and bent to form an abutting plate.

2. The foldable supporting bracket in claim 1, wherein the supporting arm has a first pivot portion in which the first pivot shaft is contained.

3. The foldable supporting bracket in claim 1, wherein the holding element has a second pivot portion in which the second pivot shaft is contained.

4. The foldable supporting bracket in claim 1, wherein the abutting plate has an anti-slip mat on a bottom surface thereof.

5. The foldable supporting bracket in claim 1, wherein the supporting arm has a hollow portion.

6. A foldable supporting bracket for a portable electronic apparatus, comprising:
    a supporting arm having a first pivot shaft at one terminal thereof;
    a holding element having a second pivot shaft at one terminal thereof; and
    two load-bearing bars separated to each other and pivotally arranged between the first pivot shaft and the second pivot shaft so that two first distal ends of the first pivot shaft are connected between the two load-bearing bars, respectively, and two second distal ends of the second pivot shaft are also connected between the two load-bearing bars, respectively, to form a hollow containing region between the first pivot shaft, the second pivot shaft and the two load-bearing bars;
    wherein the supporting arm and the holding element are pivotally connected to the two load-bearing bars via the first pivot shaft and the second pivot shaft, respectively, so that the foldable supporting bracket is folded when the supporting arm and the holding element are flipped toward and located in the hollow containing region, and
    wherein the holding element is an L-shaped plate.

7. A foldable supporting bracket for a portable electronic apparatus, comprising:
    a supporting arm having a first pivot shaft at one terminal thereof;
    a holding element having a second pivot shaft at one terminal thereof; and
    two load-bearing bars separated to each other and pivotally arranged between the first pivot shaft and the second pivot shaft so that two first distal ends of the first pivot shaft are connected between the two load-bearing bars, respectively, and two second distal ends of the second pivot shaft are also connected between the two load-bearing bars, respectively, to form a hollow containing region between the first pivot shaft, the second pivot shaft and the two load-bearing bars;
    wherein the supporting arm and the holding element are pivotally connected to the two load-bearing bars via the first pivot shaft and the second pivot shaft, respectively, so that the foldable supporting bracket is folded when the supporting arm and the holding element are flipped toward and located in the hollow containing region, and wherein the holding element has a baffle plate at the other terminal thereof and the holding element has an anti-slip mat on a top surface thereof and the baffle plate has an anti-slip mat on an inner surface thereof.

8. The foldable supporting bracket in claim 1, wherein the holding element has a hollow portion.

9. A foldable supporting bracket for a portable electronic apparatus, comprising:
a supporting arm having a first pivot shaft at one terminal thereof;
a holding element having a second pivot shaft at one terminal thereof; and
two load-bearing bars separated to each other and pivotally arranged between the first pivot shaft and the second pivot shaft so that two first distal ends of the first pivot shaft are connected between the two load-bearing bars, respectively, and two second distal ends of the second pivot shaft are also connected between the two load-bearing bars, respectively, to form a hollow containing region between the first pivot shaft, the second pivot shaft and the two load-bearing bars;
wherein the supporting arm and the holding element are pivotally connected to the two load-bearing bars via the first pivot shaft and the second pivot shaft, respectively, so that the foldable supporting bracket is folded when the supporting arm and the holding element are flipped toward and located in the hollow containing region, and
wherein each of the load-bearing bars forms an embedding edge on an inner side thereof and the embedding edge is sleeved by a belt-shaped anti-slip loop.

10. A foldable supporting bracket for a portable electronic apparatus, comprising:
a supporting arm having a first pivot shaft at one terminal thereof;
a holding element having a second pivot shaft at one terminal thereof; and
two load-bearing bars separated to each other and pivotally arranged between the first pivot shaft and the second pivot shaft to form a hollow containing region;
wherein the supporting arm and the holding element are pivotally connected to the two load-bearing bars via the first pivot shaft and the second pivot shaft, respectively, so that the foldable supporting bracket is folded when the supporting arm and the holding element are flipped toward the hollow containing region,
wherein each of the load-bearing bars forms an embedding edge on an inner side thereof and the embedding edge is sleeved by a belt-shaped anti-slip loop, and
wherein each of the anti-slip loops has an upper strap portion, a lower strap portion, and two loop portions; one of the loop portions is connected to one terminal of the upper strap portion and one terminal of the lower strap portion, respectively, and the other of the loop portions is connected to the other terminal of the upper strap portion and the other terminal of the lower strap portion, respectively; the upper strap portion protrudes from a surface of the load-bearing bar.

11. The foldable supporting bracket in claim 1, wherein each of the load-bearing bars and the supporting arm form an included angle when the foldable supporting bracket is unfolded; the included angle ranges from 75 degrees to 85 degrees.

12. The foldable supporting bracket in claim 1, wherein each of the load-bearing bars and the supporting arm form an included angle when the foldable supporting bracket is unfolded; the included angle is 80 degrees.

* * * * *